(12) United States Patent
Belamkonda

(10) Patent No.: US 11,715,382 B2
(45) Date of Patent: Aug. 1, 2023

(54) DETERMINING AIRCRAFT ORIENTATION

(71) Applicant: Honeywell International Inc., Charlotte, NC (US)

(72) Inventor: Kameswararao Belamkonda, Nellore (IN)

(73) Assignee: Honeywell International Inc., Charlotte, NC (US)

(*) Notice: Subject to any disclaimer, the term of this patent is extended or adjusted under 35 U.S.C. 154(b) by 94 days.

(21) Appl. No.: 17/498,123

(22) Filed: Oct. 11, 2021

(65) Prior Publication Data

US 2022/0028290 A1    Jan. 27, 2022

Related U.S. Application Data

(62) Division of application No. 15/972,634, filed on May 7, 2018, now Pat. No. 11,145,214.

(51) Int. Cl.
*G08G 5/06* (2006.01)
*G08G 5/00* (2006.01)

(52) U.S. Cl.
CPC ............. *G08G 5/06* (2013.01); *G08G 5/0082* (2013.01)

(58) Field of Classification Search
None
See application file for complete search history.

(56) References Cited

U.S. PATENT DOCUMENTS

| | | |
|---|---|---|
| 6,182,005 B1 | 1/2001 | Pilley et al. |
| 6,195,609 B1 | 2/2001 | Pilley et al. |
| 8,493,240 B1 | 7/2013 | Carrico |
| 2009/0018713 A1* | 1/2009 | Coulmeau ............ G08G 5/0013 701/3 |
| 2012/0245836 A1 | 9/2012 | White et al. |
| 2014/0142907 A1 | 5/2014 | Gellaboina et al. |
| 2017/0032687 A1 | 2/2017 | Lamkin et al. |
| 2018/0366009 A1 | 12/2018 | Vieten |

\* cited by examiner

*Primary Examiner* — David P. Merlino
(74) *Attorney, Agent, or Firm* — Brooks, Cameron & Huebsch, PLLC

(57) ABSTRACT

Devices, systems, and methods for determining aircraft orientation are described herein. One device includes instructions executable to determine a subsection of a rendering of a portion of an airport, wherein the subsection is associated with a particular stand of the airport, and wherein the subsection includes a plurality of ground travel pathways, determine a first subset of the plurality of pathways, a second subset of the plurality of pathways, and a third subset of the plurality of pathways, track a location of an outbound aircraft within the subsection of the rendering, determine an orientation of the aircraft according to a first set of rules responsive to a determination that the location of the aircraft is within the first or second subset of the plurality of pathways, and determine the orientation of the aircraft according to a second set of rules responsive to a determination that the location of the aircraft is within the third subset of the plurality of pathways.

20 Claims, 5 Drawing Sheets

DETERMINING AIRCRAFT ORIENTATION

PRIORITY INFORMATION

This application is a Divisional of U.S. application Ser. No. 15/972,634, filed May 7, 2018, the contents of which are incorporated herein by reference.

TECHNICAL FIELD

The present disclosure relates to devices, methods, and systems for determining aircraft orientation.

BACKGROUND

In various airports, aircraft (e.g., airplanes) can undergo a pushback. A pushback can include, for example, the aircraft being moved (e.g., pushed and/or pulled) from a stand (e.g., terminal gate) using external power. A pushback can include the aircraft being aligned towards a portion of the airport leading to a designated runway prior to departure, for instance. Aircraft pushback can be accomplished using various devices (e.g., tractors, tugs, trucks, etc.) and/or airport personnel (e.g., air traffic controller(s) (ATCs), ground crew(s), etc.).

Various applications may utilize determined positions, orientations, and/or velocities of aircraft in an airport. For instance, automated routing applications and/or conflict prevention applications may utilize such information to control aircraft movement through the airport.

General positions, orientations, and/or velocities of aircraft can be estimated using radar. However, during pushback and/or periods where aircraft are moving at relatively low speeds, for instance, radar information may be incomplete and/or noisy. Previous approaches may utilize one or more noise filtering algorithms (e.g., Kalman filtering algorithms) to estimate aircraft position, orientation, and/or velocity. Such approaches may be insufficient, particularly with regard to determining aircraft orientation as they may be unable to determine whether an aircraft is moving backward (e.g., being pushed back) or forward (e.g., upon completion of pushback). An incorrectly determined aircraft orientation may lead to invalid taxi instructions, delays, confusion, stress, repetition, safety issues, and/or invalid automatically-determined routes.

DETAILED DESCRIPTION

Figure 1:
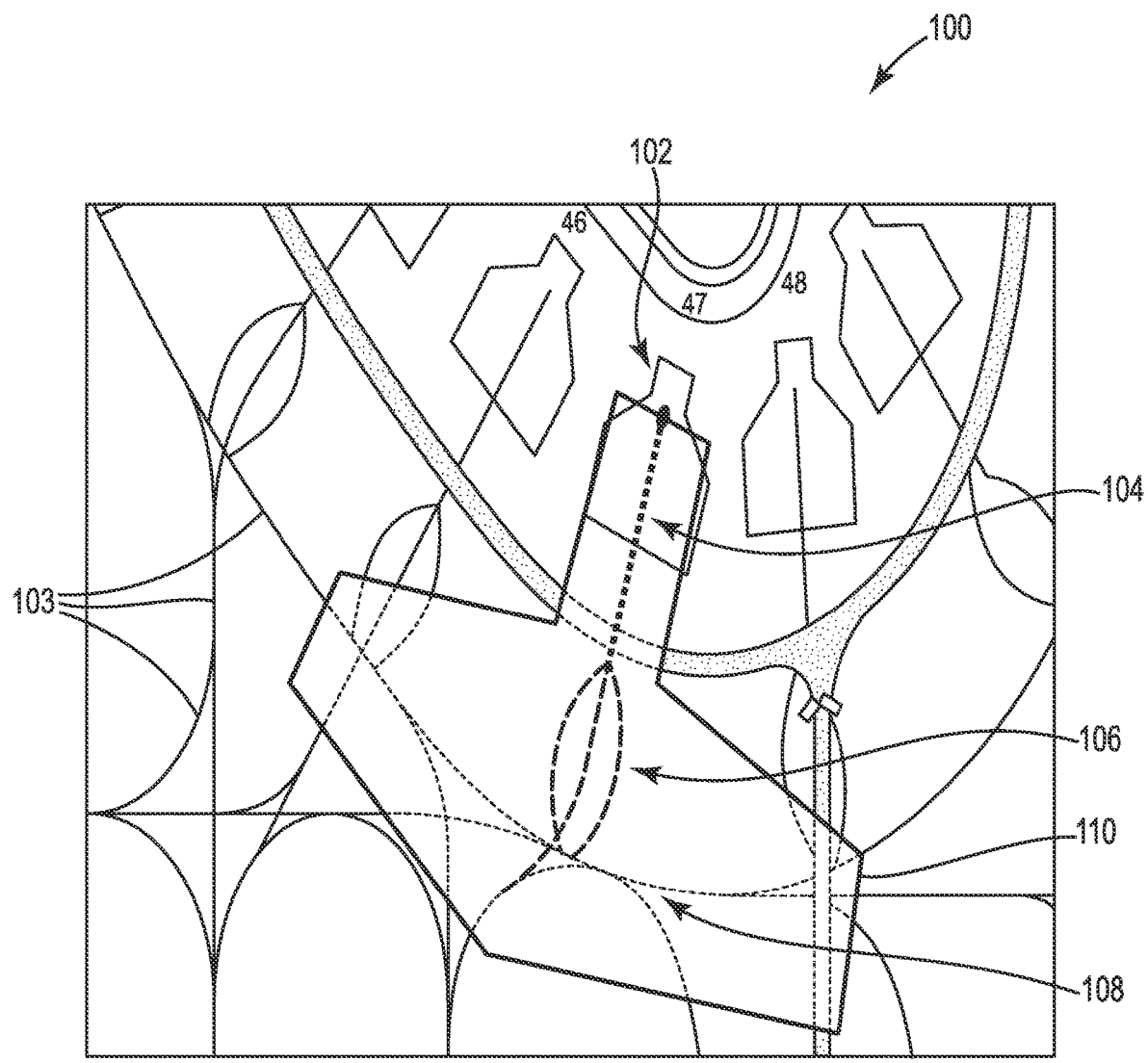
FIG. 1 illustrates a rendering of a portion of an airport in accordance with one or more embodiments of the present disclosure.

Devices, methods, and systems for determining aircraft orientation are described herein. For example, one or more embodiments include determining a subsection of a rendering of a portion of an airport, wherein the subsection is associated with a particular stand of the airport, and wherein the subsection includes a plurality of ground travel pathways, determining a first subset of the plurality of pathways, a second subset of the plurality of pathways, and a third subset of the plurality of pathways, tracking a location of an outbound aircraft within the subsection of the rendering, determining an orientation of the aircraft according to a first set of rules responsive to a determination that the location of the aircraft is within the first or second subset of the plurality of pathways, and determining the orientation of the aircraft according to a second set of rules responsive to a determination that the location of the aircraft is within the third subset of the plurality of pathways.

Determining aircraft orientation in accordance with one or more embodiments of the present disclosure can improve the functioning of computing devices configured to execute routing applications and/or conflict prevention applications to control aircraft movement through the airport. Where previous approaches may be insufficient, particularly with regard to determining aircraft orientation, embodiments herein can reduce invalid taxi instructions, delays, confusion, stress, safety issues, and/or invalid automatically-determined routes by determining an orientation of an aircraft while it is being pushed back and/or while it is moving at low speed through an airport.

As used herein, a "pushback" can refer to the aircraft being moved (e.g., pushed and/or pulled) from a stand using external power. A pushback can include the aircraft being aligned towards a taxiway leading to a designated runway prior to departure, for instance. Aircraft pushback can be accomplished using various devices (e.g., tractors, tugs, trucks, etc.) and/or airport personnel (e.g., air traffic controller(s) (ATCs), ground crew(s), etc.).

As previously discussed, previous approaches using radar may be unable to determine whether a moving aircraft is moving backward or whether it is moving forward. Stated differently, previous approaches may be unable to determine whether an aircraft is being pushed back or whether a pushback of the aircraft has been completed and the aircraft is taxiing forward. Approaches that use Kalman filtering techniques may be insufficient when the velocity and/or position of an aircraft are determined to be below uncertainty limits, for instance. These approaches may especially suffer from uncertainty in cases where multiple taxiway and/or runway centerlines are connected and/or curved.

In one example, an incorrectly determined orientation can lead to a computer-determined route (e.g., determined via a routing algorithm) given backwards. Such a route can be meaningless in some cases, costly in some cases, and dangerous in some cases. An orientation determined using embodiments herein can allow the provision of a valid route, which, as previously discussed, results in tangible monetary and safety benefits. These benefits include, but are not limited to, increases in throughput and flights arriving and/or departing on time, and reductions in confusion, stress, and/or repetition.

Embodiments of the present disclosure can divide an airport into subsections (e.g., two-dimensional polygons). Each subsection can be associated with a respective stand. Within each subsection, portions of ground travel pathways (e.g., apron centerlines) can be categorized into a plurality of groups. In some embodiments, groups can be defined based on their distance from the stand, though embodiments herein are not so limited. When an aircraft is determined to be on a portion of the subsection falling in a particular group, embodiments of the present disclosure can determine an orientation of the aircraft based, at least in part, on a set of rules particular to that group.

Embodiments of the present disclosure can be implemented using existing installations (e.g., radar systems and/or devices) at airports. Additionally, embodiments of the present disclosure can be used to automate existing pushback strategies and/or provide various notifications to airport personnel, for instance.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of polygons" can refer to one or more polygons.

FIG. 1 illustrates a rendering 100 of a portion of an airport in accordance with one or more embodiments of the present disclosure. In some embodiments, the rendering 100 can be an aerial rendering (e.g., a bird's-eye view). For example, the rendering 100 can be a digitized image, an aerial photograph, and/or other rendering(s). The particular example of the rendering 100 is included for example purposes and is not intended to be taken in a limiting sense. The rendering 100 can be received at a computing device (e.g., the computing device 518 discussed below in connection with FIG. 5). In some embodiments, the rendering 100 can be received from a building information model (BIM) associated with the airport.

The rendering 100 can depict area(s) of the airport that aircraft can be parked and/or travel along the ground. For instance, rendering 100 can depict a portion of an apron of the airport and/or a portion of a tarmac of the airport. The rendering 100 can depict an area of the airport associated with a stand (e.g., hardstand) 102. The stand 102 can be a location of the airport where aircraft are parked, loaded, unloaded, maintained, de-iced, washed, etc.

The rendering 100 can include a plurality of ground travel pathways 103. As referred to herein, ground travel pathways 103 are portions of an airport provided to allow aircraft ground travel. Ground travel pathways 103 can include aprons, taxi lanes, taxiways, tarmacs, etc. Ground travel pathways 103 can be formed of one or more travel surfaces including concrete, tarmac, asphalt, and/or gravel, for instance. Ground travel pathways 103 are not limited to a particular length, width, and/or shape. In some embodiments, a ground travel pathway may be substantially straight (e.g., a line). In some embodiments, a ground travel pathway may be curved. Ground travel pathways 103 may refer particularly to centerlines of ground travel pathways.

Embodiments of the present disclosure can define a subsection 110 of the rendering 100. The subsection 110 is sometimes referred to herein as a "polygon" but it is noted that embodiments of the present disclosure do not limit the subsection 110 to a polygon. For purposes of clarity, however, "subsection 110" and "polygon 110" are both interchangeably referred to herein.

In some embodiments, the polygon 110 can be defined responsive to inputs received via an interface. For example, a user can draw the polygon using an input device such as a mouse and/or touchscreen display. In some embodiments the polygon 110 can be defined without user input. In some embodiments, the polygon 110 can be determined based on historical pushback data associated with the stand 102. In some embodiments, the polygon 110 can be determined based on a pushback limit associated with the stand 102. For instance, an airport may enforce rules dictating a geographical limit of aircraft pushback which may be visualized by the polygon 110. It is to be appreciated that the polygon 110 shown in FIG. 1 is associated with the stand 102. A different stand can be associated with a different polygon. A shape and/or size of the polygon can differ depending on the location of the stand, the layout of the airport, and/or a type of the stand, among other things.

Embodiments of the present disclosure can categorize ground travel pathways 103 within the polygon 110 into a plurality of subsets. The example illustrated in FIG. 1 shows three subsets, though embodiments of the present disclosure are not limited to a particular number. For instance, as shown in FIG. 1, a first subset 104 (sometimes referred to herein as "stand pathway 104") can include one or more pathways connected to and/or adjacent to the stand 104 (e.g., extending from a point of the stand 104); a third subset 108 (sometimes referred to herein as "taxi pathway 108") can include one or more pathways exceeding a threshold distance from the stand 104; and a second subset 106 (sometimes referred to herein as "stand extended pathway 106") can include one or more pathways connecting one or more of the stand pathways 104 to one or more of the taxi pathways 108.

Because radar used at airports may be intermittent and/or ineffective, an outbound aircraft's location can be acquired when it is located on a pathway of the first subset 104, the second subset 106, or the third subset 108. Embodiments of the present disclosure can utilize different rules, depending on the subset where the aircraft is located, to determine whether it is being pushed back or whether pushback has been completed. Such determination can allow automated routing systems and/or conflict prevention systems to function properly.

Figure 2:
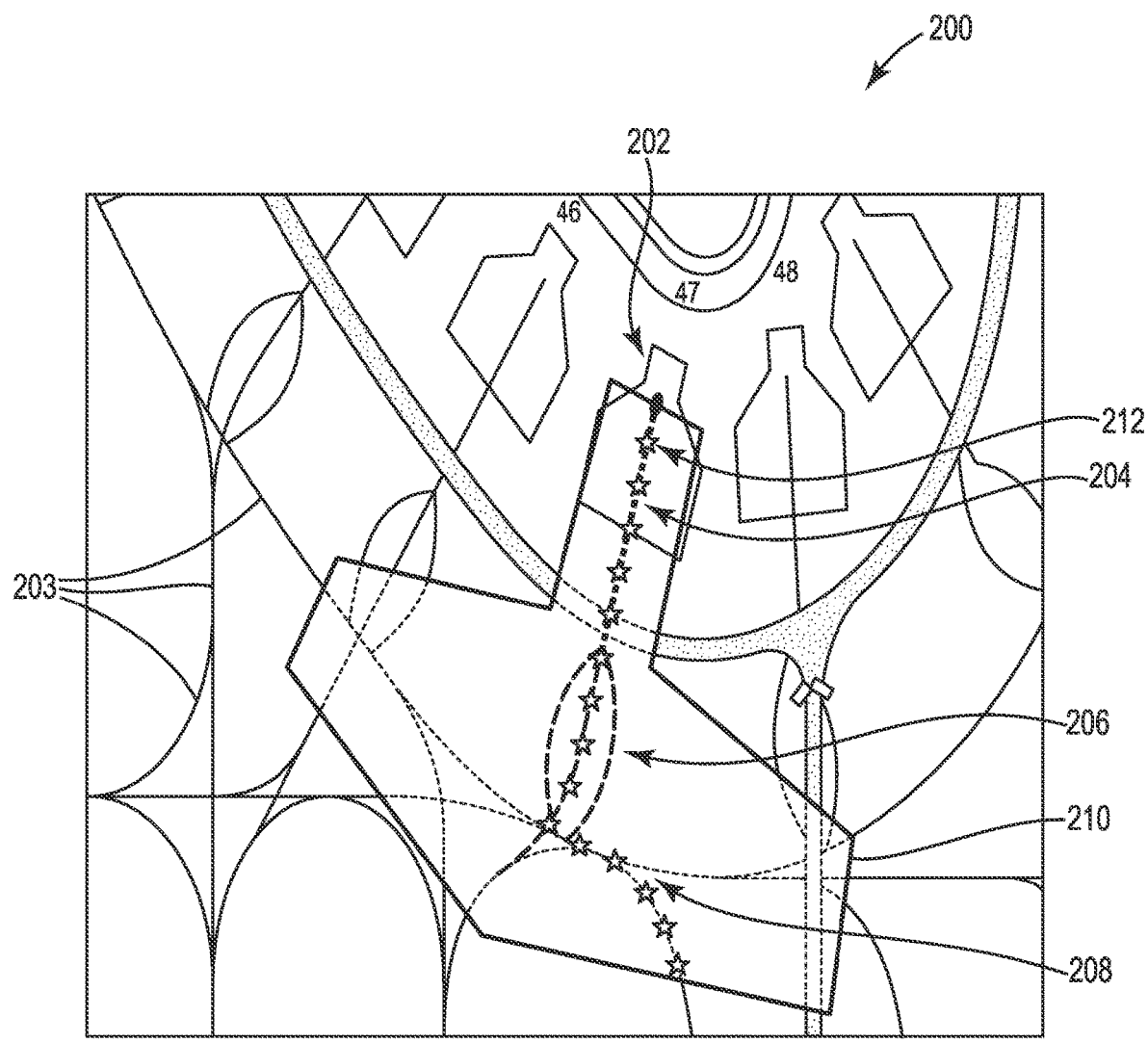
FIG. 2 illustrates the rendering of the portion of the airport where an aircraft is tracked beginning at a first position in accordance with one or more embodiments of the present disclosure.

FIG. 2 illustrates the rendering 200 of the portion of the airport where an aircraft is tracked beginning at a first position 212 in accordance with one or more embodiments of the present disclosure. In the example illustrated in FIG. 2, a tracked path of an aircraft, indicated by a plurality of stars, is acquired at a first location 212. The stars shown in FIG. 2 can represent different locations of the aircraft determined by a radar system over a period of time. In some embodiments, the locations can be determined according to a particular interval (e.g., every five seconds), though embodiments herein are not so limited.

As shown in FIG. 2, the first position 212 is located within (e.g., maps to) the stand pathway 204. Responsive to a determination that the first position 212 of the aircraft is located within the stand pathway 204, embodiments of the present disclosure can apply a particular (e.g., first) set of rules to determine whether a pushback of the aircraft is underway or whether it is completed.

For instance, as they are tracked, the different locations along the tracked path can be stored (e.g., in a memory analogous to the memory 520, described below in connection with FIG. 5). In some embodiments, an initial orientation (e.g., a forward orientation) can be determined and/or assigned responsive to a determination that a distance traveled by the aircraft exceeds an initial distance threshold. In some embodiments, a check can be performed to determine whether the aircraft is outbound.

If the aircraft is outbound, embodiments herein can determine whether a subsequent tracked location of the aircraft is within the polygon 210. According to the first set of rules, a determination can be made that a pushback of the aircraft is complete responsive to a determination that the aircraft is subsequently located on the taxi pathway 208 and the subsequent tracked location is unchanged for a particular period of time. Such a time period can be selected, for instance, to correspond to a length of time needed for a pushback vehicle to detach from the aircraft. Such a time period can be selected, for instance, based on a type of the aircraft. Stated differently, embodiments herein can change a pushback status associated with the aircraft to "complete" responsive to the subsequent tracked location of the aircraft being within the polygon 210 and the subsequent tracked location of the aircraft mapping to the taxi pathway 208 and being unchanged for a particular period of time. In such cases, the initial orientation can be retained.

Otherwise, a pushback status associated with the aircraft can be changed to "in-progress" indicating that the aircraft is still being pushed back. Stated differently, if the subsequent tracked location maps to either the stand pathway 204 or the stand extended pathway 206, and/or if the location of the aircraft is changing (e.g., the aircraft is moving), the initial orientation can be changed to indicate that the aircraft is still moving in reverse while being pushed back.

If the aircraft's movement is not determined to be outbound, the initial orientation can be retained, and the pushback status can be changed to "completed." If the subsequent tracked location is outside the polygon 210, the initial orientation can be retained, and the pushback status can be changed to "completed."

Figure 3:
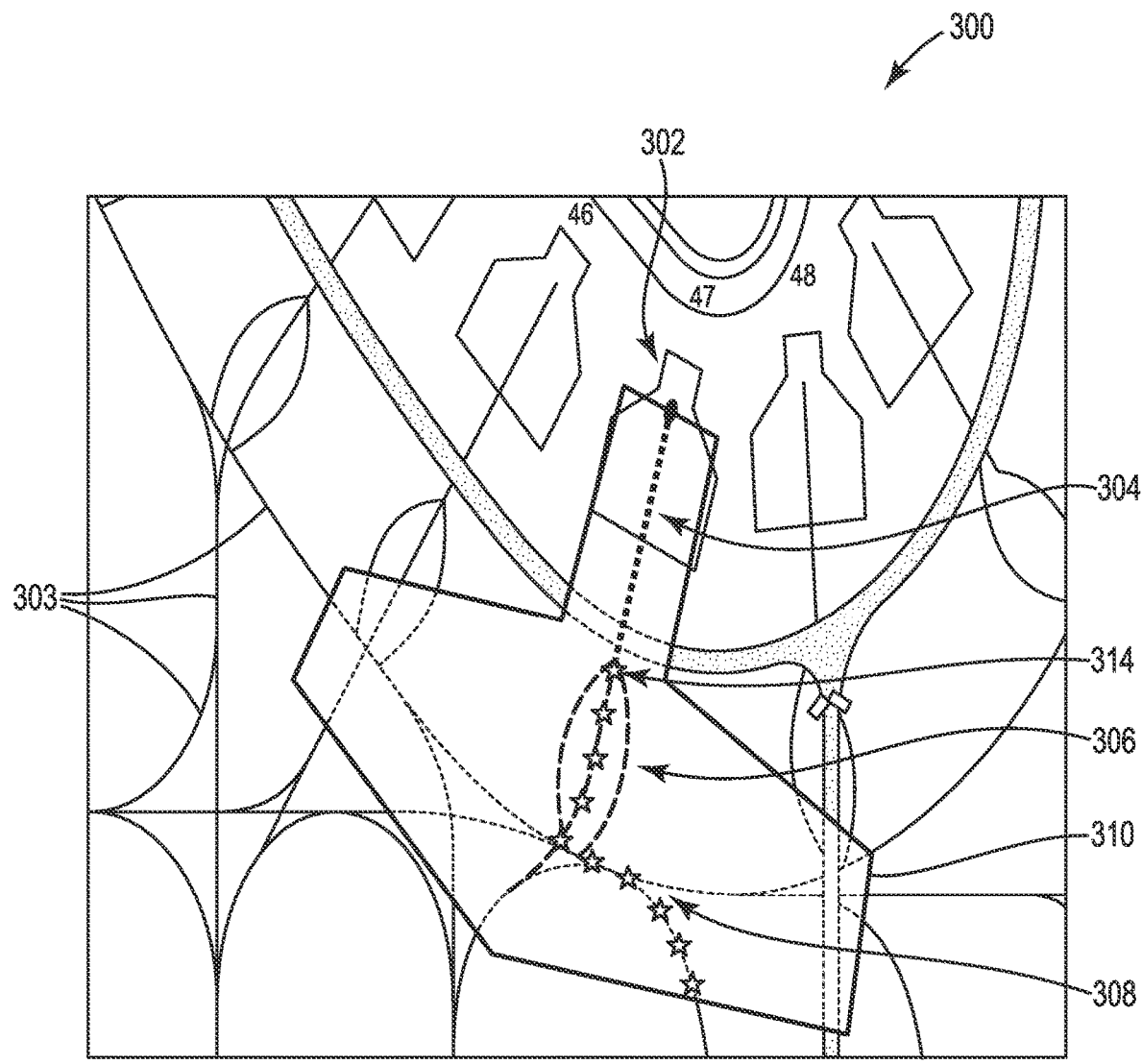
FIG. 3 illustrates the rendering of the portion of the airport where an aircraft is tracked beginning at a second position in accordance with one or more embodiments of the present disclosure.

FIG. 3 illustrates the rendering 300 of the portion of the airport where an aircraft is tracked beginning at a second position 314 in accordance with one or more embodiments of the present disclosure. In the example illustrated in FIG. 3, a tracked path of an aircraft, indicated by a plurality of stars, is acquired at a second location 314. As above, the stars shown in FIG. 3 can represent different locations of the aircraft determined by a radar system over a period of time.

As shown in FIG. 3, the second position 314 is located within (e.g., maps to) the stand extended pathway 306. Responsive to a determination that the second position 314 of the aircraft is located within the stand extended pathway 306, embodiments of the present disclosure can apply the first set of rules, in a manner analogous to that discussed above, to determine whether a pushback of the aircraft is underway or whether it is completed.

For instance, as they are tracked, the different locations along the tracked path can be stored in memory. In some embodiments, an initial orientation (e.g., a forward orientation) can be determined and/or assigned responsive to a determination that a distance traveled by the aircraft exceeds an initial distance threshold. In some embodiments, a check can be performed to determine whether the aircraft is outbound.

If the aircraft is outbound, embodiments herein can determine whether a subsequent tracked location of the aircraft is within the polygon 310. According to the first set of rules, a determination can be made that a pushback of the aircraft is complete responsive to a determination that the aircraft is subsequently located on the taxi pathway 308 and the subsequent tracked location is unchanged for a particular period of time. Such a time period can be selected, for instance, to correspond to a length of time needed for a pushback vehicle to detach from the aircraft. Such a time period can be selected, for instance, based on a type of the aircraft. Stated differently, embodiments herein can change a pushback status associated with the aircraft to "complete" responsive to the subsequent tracked location of the aircraft being within the polygon 310 and the subsequent tracked location of the aircraft mapping to the taxi pathway 308 and being unchanged for a particular period of time. In such cases, the initial orientation can be retained.

Otherwise, a pushback status associated with the aircraft can be changed to "in-progress" indicating that the aircraft is still being pushed back. Stated differently, if the subsequent tracked location maps to either the stand pathway 304 or the stand extended pathway 306, and/or if the location of the aircraft is changing (e.g., the aircraft is moving), the initial orientation can be changed to indicate that the aircraft is still moving in reverse while being pushed back.

If the aircraft's movement is not determined to be outbound, the initial orientation can be retained, and the pushback status can be changed to "completed." If the subsequent tracked location is outside the polygon 310, the initial orientation can be retained, and the pushback status can be changed to "completed."

Figure 4:
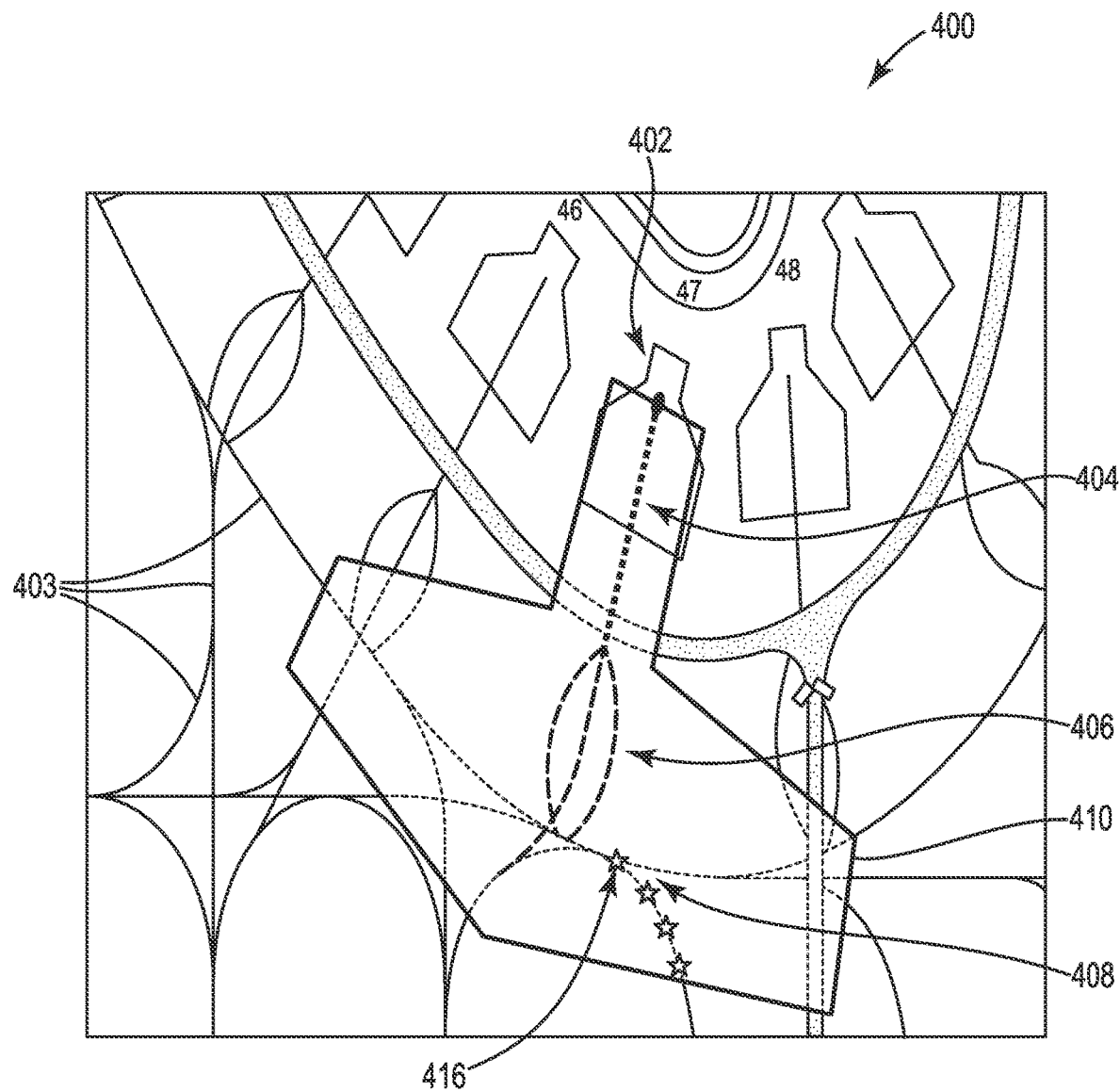
FIG. 4 illustrates the rendering of the portion of the airport where an aircraft is tracked beginning at a third position in accordance with one or more embodiments of the present disclosure.

FIG. 4 illustrates the rendering 400 of the portion of the airport where an aircraft is tracked beginning at a third position 416 in accordance with one or more embodiments of the present disclosure. In the example illustrated in FIG. 4, a tracked path of an aircraft, indicated by a plurality of stars, is acquired at a third location 416. As above, the stars shown in FIG. 4 can represent different locations of the aircraft determined by a radar system over a period of time.

As shown in FIG. 4, the third position 416 is located within (e.g., maps to) the taxi pathway 408. Responsive to a determination that the third position 416 of the aircraft is located within the taxi pathway 408, embodiments of the present disclosure can apply a second set of rules to determine whether a pushback of the aircraft is underway or whether it is completed.

For instance, as they are tracked, the different locations along the tracked path can be stored in memory. In some embodiments, an initial orientation (e.g., a forward orientation) can be determined and/or assigned responsive to a determination that a distance traveled by the aircraft exceeds an initial distance threshold. In some embodiments, a check can be performed to determine whether the aircraft is outbound. If the aircraft is outbound, embodiments herein can determine whether a subsequent tracked location of the aircraft is within the polygon 410.

When an aircraft is acquired on the taxi pathway 408, it may be particularly difficult to determine a pushback status because a number of scenarios may be possible. For instance, the aircraft could be taxiing but has stopped, the aircraft could be undergoing a pushback, or the aircraft could be taxiing at low velocity. Thus, a second set or rules and/or conditions can be applied when an aircraft is acquired on the taxi pathway 408.

According to the second set of rules in some embodiments, a determination can be made that a pushback of the aircraft is complete responsive to a determination that the tracked location indicates a velocity associated with the aircraft that exceeds a velocity threshold for a particular period of time. According to the second set of rules in some embodiments, a determination can be made that a pushback of the aircraft is complete responsive to a determination that the tracked location moved outside the polygon 410.

For instance, a determination can be made that a pushback of the aircraft is complete responsive to a determination that the aircraft is subsequently located on the taxi pathway 408 and the subsequent tracked location is unchanged for a particular period of time. Such a time period can be selected, for instance, to correspond to a length of time needed for a pushback vehicle to detach from the aircraft. Such a time period can be selected, for instance, based on a type of the aircraft. Stated differently, embodiments herein can change a pushback status associated with the aircraft to "complete" responsive to the subsequent tracked location of the aircraft being within the polygon 410 and the subsequent tracked location of the aircraft mapping to the taxi pathway 408 and being unchanged for a particular period of time. In such cases, the initial orientation can be retained.

Further, according to the second set of rules, a determination can be made that a pushback of the aircraft is complete responsive to a determination that the tracked location indicates a velocity associated with the aircraft that exceeds a velocity threshold for a particular period of time. In such cases, embodiments herein can change a pushback status associated with the aircraft to "complete" and the initial orientation can be retained Otherwise, a pushback status associated with the aircraft can be changed to "in-progress" indicating that the aircraft is still being pushed back. Stated differently, if the subsequent tracked location maps to either the stand pathway 404 or the stand extended pathway 406, and/or if the tracked location indicates a velocity associated with the aircraft that does not exceed the velocity threshold for the particular period of time, the initial orientation can be changed to an indication that orientation is unknown.

If the aircraft's movement is not determined to be outbound, the initial orientation can be retained, and the pushback status can be changed to "completed." If the subsequent tracked location is outside the polygon 410, the initial orientation can be retained, and the pushback status can be changed to "completed."

In some embodiments, if a pushback of the aircraft is determined to be complete, a notification can be provided indicating that the pushback is complete. In some embodiments, a determined orientation can be used to route the aircraft through the airport. Stated differently, embodiments of the present disclosure can include routing the aircraft to a target location of the airport based on the determined orientation. Routing, as described herein, includes the determination, provision, and/or execution of a routing plan for an aircraft from one location in the airport to a different (e.g., target) location in the airport.

Figure 5:
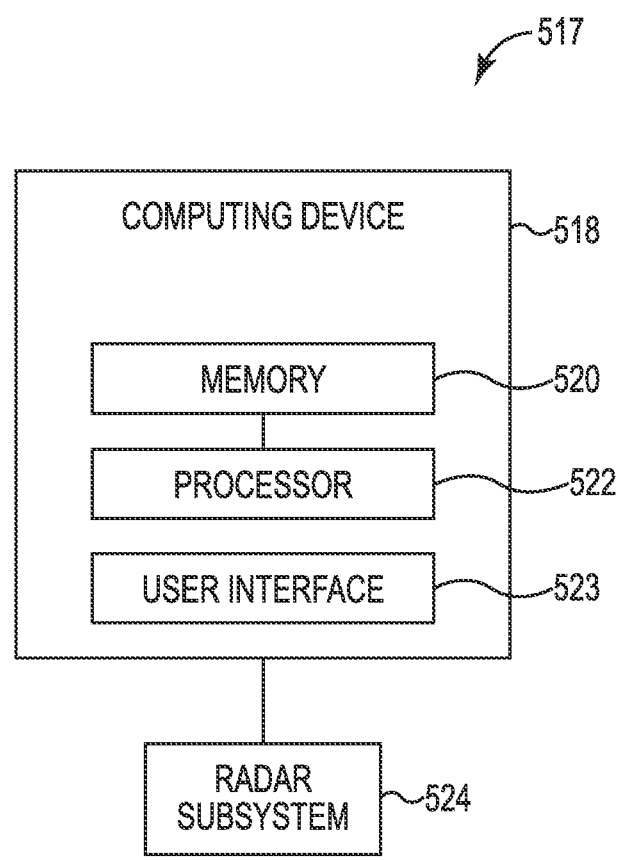
FIG. 5 illustrates a system associated with determining aircraft orientation in accordance with one or more embodiments of the present disclosure.

FIG. 5 illustrates a system 517 associated with determining aircraft orientation in accordance with one or more embodiments of the present disclosure. As shown in FIG. 5, the system 517 can include a computing device 518 and a radar subsystem 524. The computing device 518 can be, for example, a laptop computer, a desktop computer, or a mobile device (e.g., a mobile phone, a personal digital assistant, etc.), among other types of computing devices.

As shown in FIG. 5, the computing device 518 includes a memory 520 and a processor 522 coupled to the memory 520. The memory 520 can be any type of storage medium that can be accessed by the processor 522 to perform various examples of the present disclosure. For example, the memory 520 can be a non-transitory computer-readable medium having computer readable instructions (e.g., computer program instructions) stored thereon that are executable by processor 522 to determine aircraft orientation in accordance with one or more embodiments of the present disclosure.

The memory 520 can be volatile or nonvolatile memory. The memory 520 can also be removable (e.g., portable) memory, or non-removable (e.g., internal) memory. For example, the memory 520 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although the memory 520 is illustrated as being located in the computing device 518, embodiments of the present disclosure are not so limited. For example, the memory 520 can also be located internal to another computing resource (e.g., enabling computer readable instructions to be downloaded over the Internet or another wired or wireless connection). The computing device 518 can include hardware, firmware, and/or logic that can perform a particular function. As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processing resource.

The computing device 518 can include a user interface 523. A user (e.g., operator) of the computing device 518, such as, for instance, an air traffic controller, can interact with the computing device 518 via the user interface 523. For example, the user interface 523 can provide (e.g., display and/or present) information to the user of the computing device 518, and/or receive information from (e.g., input by) the user of the computing device 518. For instance, in some embodiments, the user interface 523 can be a graphical user interface (GUI) that can include a display (e.g., a screen) that can provide and/or receive information to and/or from the user of the computing device 518. The display can be, for instance, a touch-screen (e.g., the GUI can include touch-screen capabilities). As an additional example, the user interface 523 can include a keyboard and/or mouse the user can use to input information into the computing device 518. Embodiments of the present disclosure, however, are not limited to a particular type(s) of user interface.

The radar subsystem 524 can track a location of an aircraft (e.g., a grounded aircraft) in an airport. The radar subsystem 524, as used herein, is an object-detection system that uses electromagnetic radiation waves to detect movement in an area. Example devices the radar subsystem 524 can include a receiver (e.g., a dish, an antenna) and/or a transmitter. The transmitter can transmit pulses of electromagnetic radiation waves (e.g., radar signals) in predetermined directions. The electromagnetic radiation waves can bounce off of an object (e.g., an aircraft) in their path. The object can return a part of the wave's energy to the receiver. That is, the receiver can receive reflected versions of the electromagnetic radiation waves. The receiver can be located at the same site as the transmitter. The radar subsystem 524 can include one or more computing devices and/or controllers. In some embodiments, a computing device and/or controller of the radar subsystem 524 can be analogous to the computing device 518, previously described.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A non-transitory computer-readable medium having instructions stored thereon which, when executed by a processor, cause the processor to:
   determine a subsection of a rendering of a portion of an airport, wherein the subsection is associated with a particular stand of the airport, and wherein the subsection includes a plurality of ground travel pathways;
   determine a first subset of the plurality of pathways, a second subset of the plurality of pathways, and a third subset of the plurality of pathways;
   map a tracked location of a grounded aircraft to one of: the first subset of the plurality of pathways, the second subset of the plurality of pathways, and the third subset of the plurality of pathways;
   provide a notification that a pushback of the aircraft is completed when a first set of conditions is met responsive to a determination that the tracked location of the aircraft maps to the first or second subset of the plurality of pathways; and
   provide the notification that the pushback of the aircraft is completed when a second set of conditions is met responsive to a determination that the tracked location of the aircraft maps to the third subset of the plurality of pathways.

2. The medium of claim 1, wherein the rendering is an aerial rendering.

3. The medium of claim 1, including instructions to determine the subsection without user input.

4. The medium of claim 1, including instructions to determine the subsection responsive to an input received via an interface.

5. The medium of claim 1, including instructions to determine that the second set of conditions is met responsive to a determination that the tracked location of the aircraft is within the subsection of the rendering of the airport.

6. The medium of claim 1, including instructions to determine that the tracked location indicates a velocity associated with the aircraft that exceeds a velocity threshold for a particular period of time.

7. The medium of claim 1, including instructions to determine an orientation of the aircraft based, at least in part on the mapping.

8. The medium of claim 7, including instructions to route the aircraft to a target location of the airport based on the determined orientation.

9. The medium of claim 7, including instructions to determine that the grounded aircraft is outbound before mapping the tracked location.

10. The medium of claim 7, including instructions to map the tracked location of the grounded aircraft responsive to the grounded aircraft traveling a distance exceeding a distance threshold.

11. A system for determining aircraft orientation, comprising:
    a radar subsystem configured to track a location of a grounded aircraft in an airport; and
    a computing device configured to:
    determine a subsection of a rendering of an airport, wherein the subsection is associated with a particular stand of the airport, and wherein the subsection includes a plurality of ground travel pathways;
    determine a first subset of the plurality of pathways, a second subset of the plurality of pathways, and a third subset of the plurality of pathways;
    map the tracked location of the aircraft to one of: the first subset of the plurality of pathways, the second subset of the plurality of pathways, and the third subset of the plurality of pathways;
    provide a notification that a pushback of the aircraft is completed when a first set of conditions is met responsive to a determination that the tracked location of the aircraft maps to the first or second subset of the plurality of pathways; and
    provide the notification that the pushback of the aircraft is completed when a second set of conditions is met responsive to a determination that the tracked location of the aircraft maps to the third subset of the plurality of pathways.

12. The system of claim 11, wherein the rendering is a two-dimensional aerial rendering, and wherein the subsection is a polygon.

13. The system of claim 11, wherein the computing device is configured to determine that the grounded aircraft is outbound before mapping the tracked location.

14. The system of claim 11, wherein the computing device is configured to determine that the grounded aircraft has traveled a distance exceeding a distance threshold before mapping the tracked location to any of the first subset of the plurality of pathways, the second subset of the plurality of pathways, and the third subset of the plurality of pathways.

15. The system of claim 11, wherein the computing device is configured to determine that the first set of conditions is met responsive to a determination that:

the tracked location of the aircraft is within the subsection of the rendering of the airport; and a subsequent tracked location of the aircraft maps to the third subset of the plurality of pathways and is unchanged for a particular period of time.

16. The system of claim 11, wherein the computing device is configured to determine that the second set of conditions is met responsive to a determination that:

the tracked location of the aircraft is within the subsection of the rendering of the airport; and the tracked location indicates a velocity associated with the aircraft that exceeds a velocity threshold for a particular period of time.

17. The system of claim 11, wherein the computing device is configured to determine that the second set of conditions is met responsive to a determination that the tracked location moved outside the subsection of the rendering of the airport.

18. A method for determining aircraft orientation, wherein the method includes:

receive a rendering of a portion of an airport;

determining a subsection of the rendering associated with a particular stand of the airport, wherein the subsection includes a plurality of ground travel pathways, determining a first subset of the plurality of pathways, a second subset of the plurality of pathways, and a third subset of the plurality of pathways;

mapping the tracked location of the aircraft to one of: the first subset of the plurality of pathways, the second subset of the plurality of pathways, and the third subset of the plurality of pathways;

determining an orientation of the aircraft based, at least in part on the mapping; and routing the aircraft to a target location of the airport based on the determined orientation.

19. The method of claim 18, wherein the method includes determining the subsection of the rendering based on historical pushback data associated with the particular stand.

20. The method of claim 18, wherein the method includes determining the subsection of the rendering based on a pushback limit associated with the particular stand.

* * * * *